United States Patent
Muth et al.

(10) Patent No.: US 8,780,961 B2
(45) Date of Patent: Jul. 15, 2014

(54) MIXED-MODE WIRELESS DEVICE OPERATION

(75) Inventors: James Michael Muth, Santa Ana, CA (US); Stephen McIntyre, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 374 days.

(21) Appl. No.: 13/021,129

(22) Filed: Feb. 4, 2011

(65) Prior Publication Data

US 2012/0106658 A1    May 3, 2012

Related U.S. Application Data

(60) Provisional application No. 61/408,214, filed on Oct. 29, 2010.

(51) Int. Cl.
*H04B 1/38* (2006.01)
(52) U.S. Cl.
USPC ........... 375/219; 370/259; 370/354; 370/346; 370/311; 370/336; 370/328; 370/449; 455/41.2; 455/458; 455/572; 455/574
(58) Field of Classification Search
USPC .......... 375/130–240, 241–377; 370/200–546; 455/1–899; 326/1–136; 379/1–457; 700/1–306
See application file for complete search history.

(56) References Cited

U.S. PATENT DOCUMENTS

| | | | |
|---|---|---|---|
| 6,950,645 B1 * | 9/2005 | Kammer et al. | 455/343.1 |
| 7,193,986 B2 * | 3/2007 | Scanlon et al. | 370/338 |
| 7,660,578 B2 * | 2/2010 | Viitamaki et al. | 455/426.2 |
| 7,904,023 B2 * | 3/2011 | Viitamaki et al. | 455/41.2 |
| 8,018,885 B2 * | 9/2011 | Haartsen | 370/311 |
| 2003/0003867 A1 * | 1/2003 | Kawamura | 455/41 |
| 2003/0060161 A1 * | 3/2003 | Park | 455/41 |
| 2003/0220076 A1 * | 11/2003 | Katayama et al. | 455/41.2 |
| 2004/0029621 A1 * | 2/2004 | Karaoguz et al. | 455/574 |
| 2004/0192413 A1 * | 9/2004 | Frank | 455/574 |

(Continued)

FOREIGN PATENT DOCUMENTS

| | | |
|---|---|---|
| EP | 0 773 651 A1 | 5/1997 |
| WO | WO 2004/110081 A1 | 12/2004 |

OTHER PUBLICATIONS

Sumit Garg, et al., "Mac Scheduling Policies for Power Optimization in Bluetooth: A Master Driven TDD Wireless System" VTC 2000-Spring. 2000 IEEE 51.sup.st. Vehicular Technology Conference Proceedings. Tokyo, Japan, May 15-18, 2000, IEEE Vehicular Technology Conference, New York, NY: IEEE, US vol. 1 of 3, May 15, 2000, pp. 196-200, XP000970607.*

(Continued)

*Primary Examiner* — Daniel Washburn
*Assistant Examiner* — Amneet Singh
(74) *Attorney, Agent, or Firm* — Sterne, Kessler, Goldstein & Fox PLLC

(57) ABSTRACT

Systems and methods to operate wireless devices are provided herein. In an exemplary system a first wireless device coupled to a consumer electronics device is operated in a sleep mode. It is determined whether there is a second device is operating in the same bandwidth spectrum as the first device. If there is a second device operating in the same bandwidth spectrum, then the first device is switched to a sniff mode of operation.

27 Claims, 5 Drawing Sheets

(56) References Cited

U.S. PATENT DOCUMENTS

| | | | |
|---|---|---|---|
| 2004/0259542 A1* | 12/2004 | Viitamaki et al. | 455/426.2 |
| 2005/0020322 A1* | 1/2005 | Ruuska et al. | 455/574 |
| 2005/0169201 A1* | 8/2005 | Huylebroeck | 370/311 |
| 2006/0292987 A1* | 12/2006 | Ophir et al. | 455/41.2 |
| 2007/0147332 A1* | 6/2007 | Lappetelainen et al. | 370/346 |
| 2009/0116437 A1* | 5/2009 | Alexandre et al. | 370/329 |
| 2010/0035545 A1 | 2/2010 | Ibrahim et al. | |
| 2010/0061326 A1* | 3/2010 | Lee et al. | 370/329 |
| 2010/0203905 A1* | 8/2010 | Chaubey et al. | 455/458 |
| 2010/0283600 A1* | 11/2010 | Herbert et al. | 340/539.1 |
| 2010/0309831 A1* | 12/2010 | Yeh et al. | 370/311 |
| 2011/0169654 A1* | 7/2011 | Ketari | 340/687 |
| 2012/0230303 A1* | 9/2012 | Guo et al. | 370/336 |

OTHER PUBLICATIONS

European Search Report for EP Application No. EP 11 00 8469, Munich, Germany, dated Feb. 3, 2012 (5 pages).

* cited by examiner

MIXED-MODE WIRELESS DEVICE OPERATION

CROSS-REFERENCE TO RELATED APPLICATION

This application claims the benefit of U.S. Provisional Application No. 61/408,214 filed Oct. 29, 2010, which is incorporated herein by reference in its entirety.

FIELD OF THE INVENTION

The present application generally relates to wireless devices and more specifically to mixed-mode wireless device operation.

BACKGROUND OF THE INVENTION

Consumer electronics device often interface with wireless remote controls to allow an end user to send commands to the consumer electronics device. Some of the means used by a remote control to communicate with the consumer electronics device may drain a battery of the remote control faster than others. Solutions to conserve battery power may consume significant bandwidth of the consumer electronics device while also interfering with the operation of other wireless devices coupled to the consumer electronics device.

Methods and systems are needed to overcome the above mentioned deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 1 illustrates wireless communication between a consumer electronics device and peripheral devices according to an embodiment of the invention.

FIG. 2 further illustrates a consumer electronics device and a remote control according to an embodiment of the invention.

The present invention will now be described with reference to the accompanying drawings. In the drawings, like reference numbers may indicate identical or functionally similar elements.

DETAILED DESCRIPTION OF THE INVENTION

Figure 1:
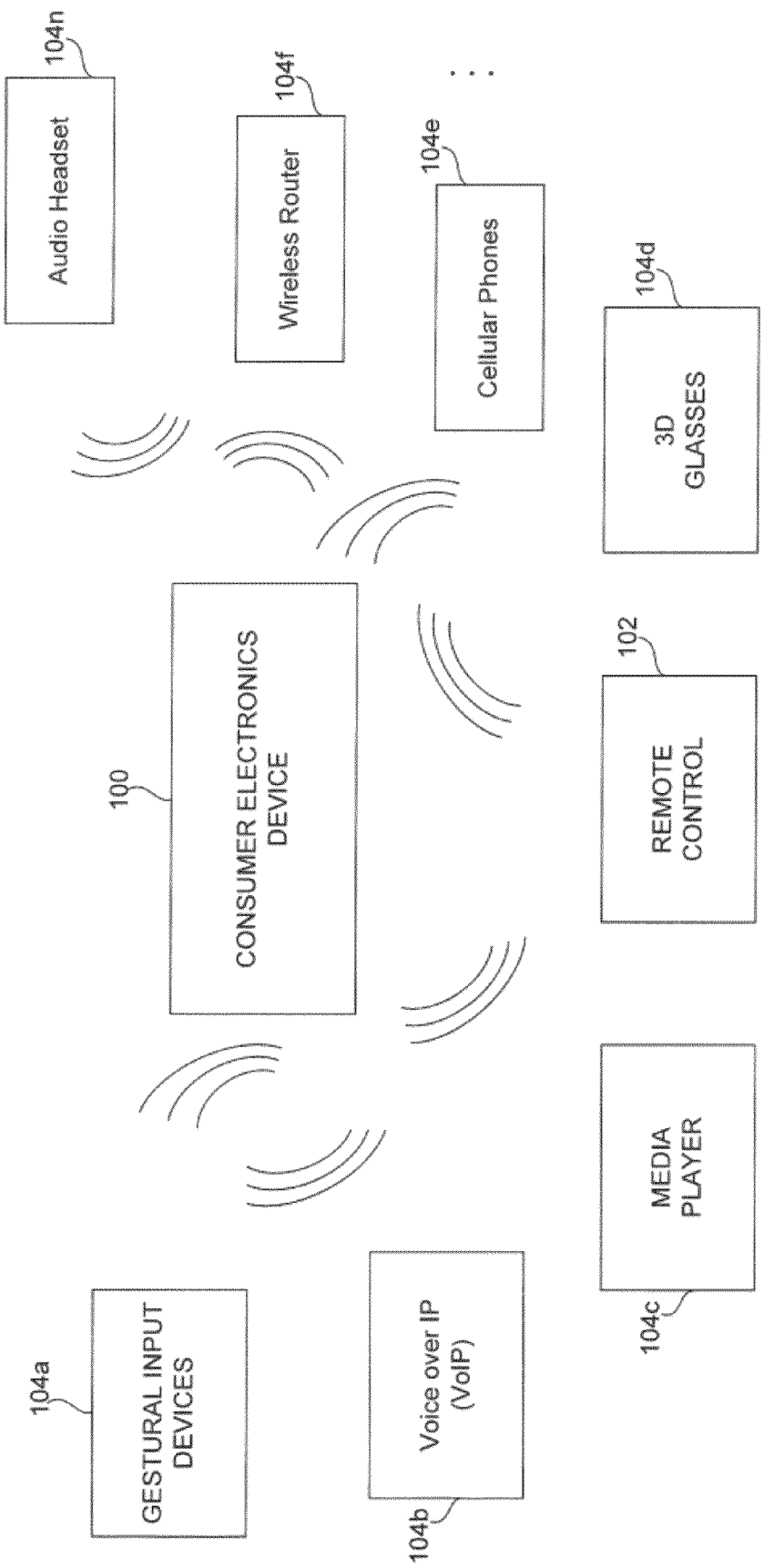

FIG. 1 illustrates wireless communication between peripheral devices and a consumer electronics device using wireless communication, for example, radio frequency (RF) communication. FIG. 1 shows a consumer electronics device 100 that wirelessly communicates with a remote control 102 and other peripheral wireless devices such as: gestural input device 104a, voice over IP (VoIP) device 104b, media player 104c, three-dimensional (3D) glasses 104d, cellular phone 104e, wireless router 104f and audio headset 104n. In an example, all the devices illustrated in FIG. 1 are Bluetooth devices that utilize the Bluetooth communication standard. In another example, the devices illustrated in FIG. 1 are wireless devices that operate using different wireless protocols such as, including but not limited to, Bluetooth (IEEE 802.15.2), Wi-Fi (IEEE 802.11), Wireless Local Area Network (WLAN) (IEEE 802.11) and ZigBee (IEEE 802.15.4) wireless standard. In an example, the devices illustrated in FIG. 1 operate within the same bandwidth spectrum. It is to be appreciated that the type of wireless protocol being used is a design choice and may be arbitrary. Devices 104 may be referred to as "peripheral devices", "wireless devices" or "Bluetooth devices" herein. Remote control 102 may be referred to as a "Bluetooth remote control" or a "wireless remote control" herein.

Consumer electronics device 100 is a master or a host device. Bluetooth remote control 102 and wireless devices 104a-n are slave device that wirelessly communicate with or are "wirelessly coupled to", "wirelessly bonded to" or "wirelessly paired to" master device 100. "Wirelessly coupled to", "wirelessly bonded to" or "wirelessly paired to" as referred to herein refers to wireless communication between devices. Remote 102 and wireless devices 104a-n register with consumer electronics device 100 to allow data to be transmitted or received to/from consumer electronics device 100. In an example, consumer electronics device 100 maybe, for example, a television, a cable television set top box, an amplifier, a receiver, a DVD player, a blu-ray media player or any type of device that is a master device that communicates with slave devices.

Wireless devices 104 differ in operation from wireless remote control 102, in that they either continuously or periodically transmit or receive data to/from consumer electronics device 100. In contrast, remote control 102 transmits data to consumer electronics device 100 at random or intermittent intervals of time. For example, gestural input devices, such as video game controllers, may periodically transmit data to consumer electronics device 100. 3D glasses 104d may continuously receive data from consumer electronics device 100 if a user is viewing media transmitted by consumer electronics device 100. Cellular phones 104e, may continuously or periodically transmit or receive, audio or video media to/from consumer electronics device 100. Audio headset 104n may continuously receive an audio transmission from consumer electronics device 100. Similarly, media player 104C may continuously transmit or receive data or media to/from consumer electronics device 100. Voice over IP (VoIP) devices 104b may also transmit and receive data continuously from consumer electronics device 100. VoIP device 104b may be a Bluetooth headset that supports VoIP applications. In contrast, remote control 102 transmits data to consumer electronics device 104 at random intervals, for example, when a user using remote control 102 presses a key on the remote control 102 to transmit a command to consumer electronics device 100.

Figure 2:
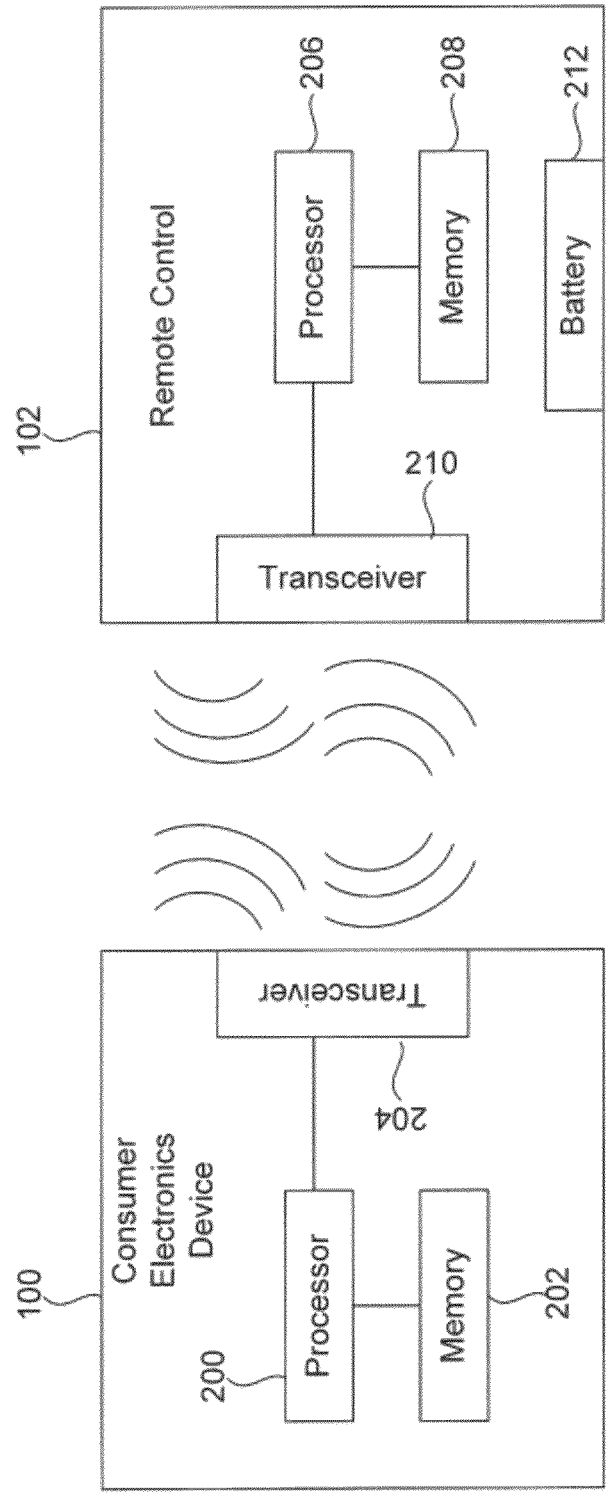

FIG. 2 further illustrates consumer electronics device 100 and remote control 102 according to an embodiment of the invention. Consumer electronics device 100 includes a processor 200 coupled to a memory 202 and a radio frequency (RF) transceiver 204. Processor 200 transmits and receives data to/from remote control 102 and wireless devices 104a-n using transceiver 204. Processor 200 may perform the functions described herein based on instructions stored in memory 202.

Remote control 102 includes a processor 206 coupled to memory 208 and a radio frequency (RF) transceiver 210. Remote control 102 communicates with consumer electronics device 100 using transceiver 210. Processor 206 is configured to perform the functions described herein based on instructions stored in memory 208. In an embodiment, processor 206 and transceiver 210 may be integrated into a single chip or a single device. Remote control 102 is powered by battery 212.

Mixed Mode Operation

In an example, remote control 102 is a remote control operating on the Bluetooth protocol. In an example, remote control 102 is operating using Bluetooth Low Energy Technology of the Bluetooth 4.0 specification. Remote control 102 may be configured to operate in a "sleep mode" or a "sniff mode." In a sleep mode, remote control 102 turns off its processor 206 and radio frequency transceiver 210 to conserve battery 212 until an event occurs that causes it to exit sleep mode and restart the processor 206 and transceiver 210 to transmit data to consumer electronics device 100. For example, when a user using remote control 102 presses a button on the remote control to transmit data to consumer electronics device 100, remote control 102 turns on processor 206 and transceiver 216 to transmit the command indicated by the key pressed to consumer electronics device 100. Thus, in sleep mode, battery 212 is conserved since processor 206 and transceiver 210 are mostly powered off except for random intervals when remote control 102 has to transmit data to consumer electronics device 100.

When remote control 102 is being operated in a sleep mode, consumer electronics device 100 goes into a "continuous scan mode." In the continuous scan mode, consumer electronics device 100 continuously scans a bandwidth spectrum used by remote control 102 in the event that remote control 102 wakes up from sleep mode and transmits data to consumer electronics device 100. The consumer electronics device 100 does not know when the remote control 102 will wake up from sleep mode and transmit data to the consumer electronics device 100. The continuous scanning therefore reduces a time lag between a button press on remote control 102 and the command being received by consumer electronics device 100.

Consumer electronics device 100 typically communicates with wireless devices such as remote control 102 and peripheral devices 104 by allocating a certain time slot to each device during which the device can communicate with consumer electronics device 100. In a continuous scan mode, consumer electronics device 100 has to use up a significant number of these time slots just to scan for data from the remote control 102. Thus, while sleep mode conserves battery 212, it also consumes a significant number of time slots and processing resources of consumer electronics device 100 to continuously scan for data from remote control 102. The scan mode may prevent consumer electronics device 100 from servicing other wireless peripheral devices 104a-n since there are too few time slots left to communicate with peripheral devices 104.

In a sniff mode, remote control 102 is configured to periodically power up its processor 206 and radio frequency transceiver 210. Upon powering up its processor 206 and radio frequency transceiver 210, remote control 102 synchronizes with customer electronic device 100 during its allocated time slot, transmits data, for example a key press, if there is data to be transmitted and powers down the processor 206 and the memory 208 after synchronizing/transmitting.

As described above, the remote control 102 is a device that transmits data to consumer electronics device 102 at random time intervals. For example, remote control 102 only transmits data, such as key presses when a user using remote control 102 decides to send a command to consumer electronics device 100. The time interval at which an operator sends a command using remote control 102 to consumer electronics device 100 is based on the consumer's preference and is therefore random. Thus, a sniff mode which causes remote control 102 to periodically connect to consumer electronics device 100, drains more battery power of remote control 102 as compared to a sleep mode where the remote control 102 powers up processor 206 and transceiver 210 only when there is data to be transmitted to consumer electronic device 100.

When a remote control is being operated in a sniff mode, consumer electronics device 100 goes into a "selective scan" mode where it scans for data from remote control 102 only during certain time periods or time slots that are allotted to remote control 102. Thus, in "selective scan mode" consumer electronics device 100 only periodically scans for data from remote control 102, as compared to "continuous scan" mode where consumer electronics device 100 continuously scans a bandwidth spectrum for data from remote control 102. Periodically scanning for data from remote control 102 frees up time slots for consumer electronics device 102 to service other peripheral devices 104. In an example, processor 200 is configured to use transceiver 204 to scan the frequency spectrum when remote control 102 is being operated in either sleep mode or sniff mode.

In typical systems, a remote control is configured to operate in either only sleep mode or in sniff mode. That is traditional remotes are programmed to support either only sleep mode operation or only sniff mode operation, and hence traditional remotes cannot switch between sleep mode and sniff mode. According to an embodiment of the invention, remote control 102 is configured with hardware and software to allow operation in either sleep mode or sniff mode. In other words, processor 206 of remote control 102 has hardware, software or firmware stored in memory 208 that allows it to be operated in either sleep mode or sniff mode. According to an embodiment of the invention, as described herein, consumer electronics device 100 manages an operating state of remote control 102 and determines whether remote control 102 is to be operated in a sleep mode or in sniff mode.

According to an embodiment of the invention, by default, remote control 102 operates in sleep mode. After exiting from sleep mode, connecting to consumer electronics device 100 and transmitting data, remote control 102 sends a request to consumer electronics device 100 to go back into sleep mode. If consumer electronics device 100 acknowledges or confirms the request then remote control device 102 goes back into sleep mode. If consumer electronics device 100 does not reply to the request from remote control 102 to go back into sleep mode then, according to an embodiment of the invention, remote control 102 automatically switches to sniff mode. In another example, consumer electronics device 100 may actively send a command, for example using a packet, to remote control 102 to go into sniff mode. In a further example, after exiting from sleep mode, connecting to consumer electronics device 100 and transmitting data, remote control 102 goes back into sleep mode by default. In this example, consumer electronics device 100 may prevent remote control 102 from going back into sleep mode by negotiating a connection with remote control 102. In this example, negotiating a connection with remote control 102 switches remote control 102 from sleep mode to sniff mode.

As described above, continuously scanning for data from remote control 102 when remote control 102 is in sniff mode consumes the bandwidth resources of consumer electronics device 100. If, for example, another device such as peripheral devices 104a-n attempts to connect to consumer electronics device 100 to transmit or receive data using the same bandwidth spectrum as remote control 102, consumer electronics device 100 may not have sufficient time slots to adequately service the request because it is using a significant number of available time slots to scan for data from remote control 102.

According to an embodiment of the invention, consumer electronics device 100 is configured to determine if there is a wireless device 104 that is operating in the bandwidth spectrum utilized by remote control 102. For example, if audio headset 104n connects to consumer electronics device 100 using Bluetooth and remote control 102 is also using Bluetooth, then the audio headset 104n and remote control 102 will be using the same bandwidth spectrum. In another example, if remote control 102 uses a Bluetooth bandwidth spectrum and a device using WLAN such as a laptop also connects to consumer electronics device 100, then both remote control 102 and the laptop will be using the same spectrum because WLAN and Bluetooth use an overlapping frequency spectrum. Alternatively, if a peripheral device 104 uses infrared to connect to consumer electronics device 102, then it will not be using the same bandwidth spectrum as a Bluetooth remote control 104. In an embodiment, the bandwidth spectrum may be from 2.4 Ghz to 2.5 GHz.

Upon detecting a device operating in the bandwidth spectrum of remote control 102, consumer electronics device 100 is configured to switch remote control 102 from sleep mode to sniff mode. Remote control 102, in sniff mode is configured to transmit data to consumer electronics device 100 during specific time slots. By switching remote control 102 to sniff mode, consumer electronics device 100 has to only monitor the bandwidth spectrum for data from remote control 102 during the specific time slots. Therefore, the un-used timeslots can be used for communication with other peripheral devices.

In an example, consumer electronics device 100 detects that a wireless device 104 is attempting to operate in the same bandwidth spectrum as remote control 102 when the device 104 connects or registers with consumer electronics device 100 as a wireless communication device. Upon detection, consumer electronics device 100 commands remote control 102 to switch to sniff mode by either sending a command to remote control 102 or by not acknowledging a request from remote control 102 to go into sleep mode. Consumer electronics device 100, upon detecting that all peripheral devices 104 have disconnected or are not utilizing the same bandwidth spectrum as remote control 102, switches remote control 102 back to sleep mode by sending a command to remote control 102. Thus, consumer electronics device 100 either conserves a battery 212 of remote control 102 by operating remote control 102 in sleep mode or allows remote control 102 and peripheral devices 104 to operate concurrently by operating remote control 102 in a sniff mode.

Figure 3:
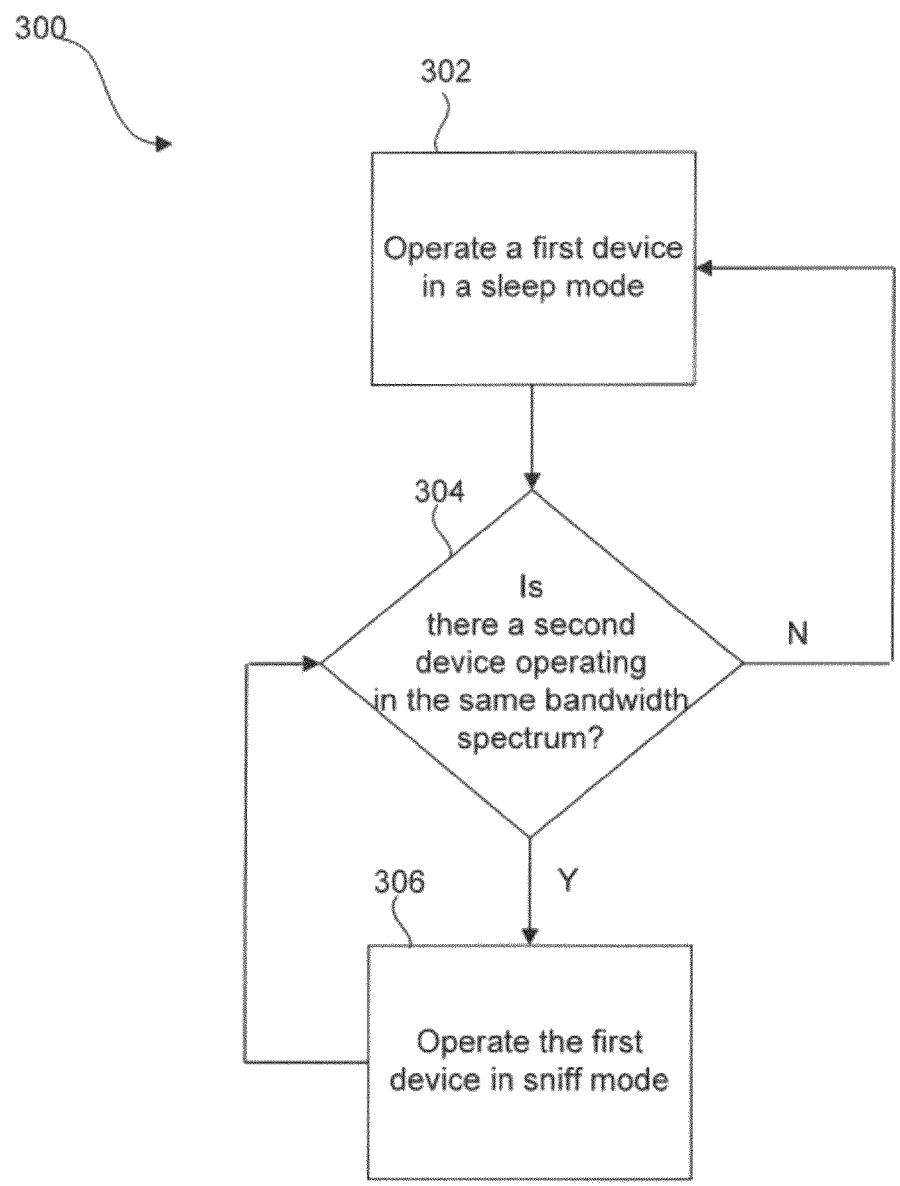
FIG. 3 illustrates an example flowchart illustrating steps performed by a consumer electronics device to operate a mixed mode remote control according to an embodiment of the invention.

FIG. 3 illustrates an example flowchart 300 illustrating steps performed by a host consumer electronics device 100 to operate a mixed mode remote control 102 according to an embodiment of the invention. Flowchart 300 will be described with continued reference to the example operating environment depicted in FIGS. 1-2. However, the flowchart is not limited to these embodiments. Note that some steps shown in flowchart 300 do not necessarily have to occur in the order shown. The steps in flow chart 300 may be performed by, for example, consumer electronics device 102 or by processor 200 based on instructions stored in memory 202.

In step 302, a first peripheral device is operated in a sleep mode. For example, consumer electronics device 100 commands remote control 102 to operate in a sleep mode. For example, processor 200, based on instructions in memory 202, sends a command to remote control 102 using transceiver 204 to operate in a sleep mode. In another embodiment, remote control 102 may operate by default in sleep mode.

In step 304, it is determined whether there is a second peripheral device operating in the same bandwidth spectrum as the first peripheral device. For example, consumer electronics device 100 determines whether there is a second peripheral device operating in the same bandwidth spectrum as the first peripheral device. In an example, the second peripheral device is wireless device 104 and the first peripheral device is the remote control 102. For example, processor 200 may determine whether there is a wireless device 104 attempting to connect to consumer electronics device 200 and whether the wireless device 104 operates in the same bandwidth spectrum as the remote control 102.

If it is determined that there is no second peripheral device operating in the same bandwidth spectrum as the first peripheral device, then control proceeds to step 302 and the first device is continued to be operated in a sleep mode.

If it is determined, that there is a second peripheral device operating in the same bandwidth spectrum as the first peripheral device, then control proceeds to step 306.

In step 306, the first peripheral device is commanded to operate in a sniff mode. For example, processor 200 of consumer electronics device 100, based on instructions in memory 202, uses transceiver 204 to command remote control 102 to operate in a sniff mode. Control proceeds back to step 304, where consumer electronics device 100 periodically determines whether there are any other peripheral devices that are operating in the same bandwidth spectrum as remote control 102. If there are no such devices, then the consumer electronics device 100 commands the remote control to again operate in a sleep mode and control proceeds to step 302.

Figure 4:
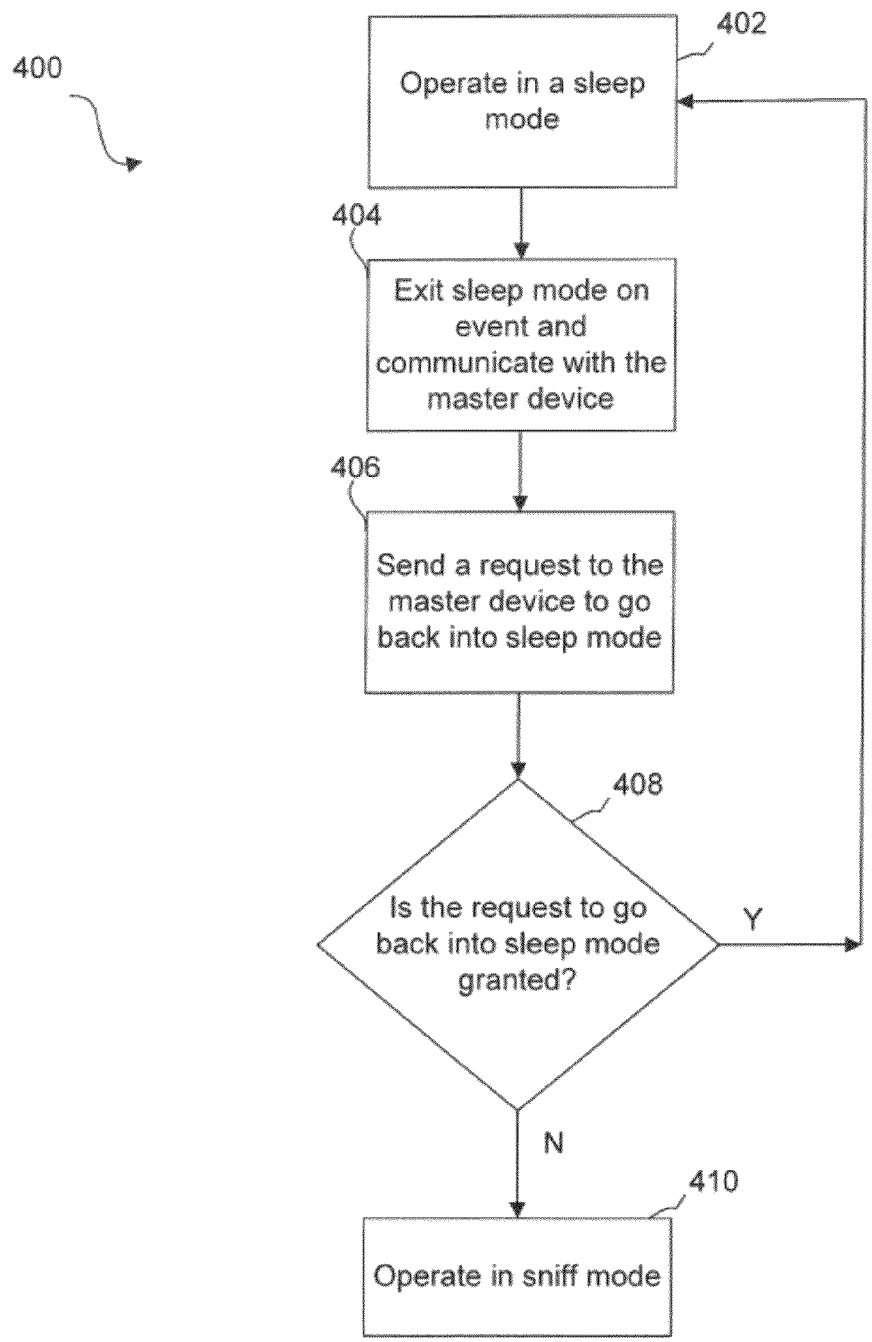
FIG. 4 illustrates an example flowchart illustrating steps performed by a mixed mode remote control according to an embodiment of the invention.

FIG. 4 illustrates an example flowchart 400 illustrating steps performed by a mixed mode remote control 102 according to an embodiment of the invention. Flowchart 400 will be described with continued reference to the example operating environment depicted in FIGS. 1-2. However, the flowchart is not limited to these embodiments. Note that some steps shown in flowchart 400 do not necessarily have to occur in the order shown. The steps in flow chart 400 may be performed by processor 206 of remote control 102 based on instructions stored in memory 208.

In step 402, a slave device operates in a sleep mode. For example, a remote control 102 is a slave device that operates in a sleep mode by default. In another example, the remote control 102 is a slave device that operates in sleep mode based on instructions received from a consumer electronics device 100.

In step 404, the slave device exits a sleep mode when an event occurs and communicates with the master device. The event may be a user input. For example, remote control 102 exits sleep mode when there is a button press and communicates a command related to the button press to the consumer electronics device 100.

In step 406, the slave device sends a request to the master device for it to go back into sleep mode. For example, remote control 102 sends a request to consumer electronics device 100 to go back into sleep mode.

In step 408, it is determined whether the master device grants the request to go back into sleep mode. For example, remote control 102 determines whether consumer electronics device 102 has granted the request to go back into sleep mode.

If the request is granted by the master device then the process proceeds to step 402.

If the request is denied or not acknowledged by the master device then control proceeds to step 410.

In step 410, the slave device operates in a sniff mode until it receives a command from consumer electronics device 100 to go back into sleep mode. For example, remote control 102 operates in sniff mode until it receives a command from consumer electronics device 100 to go back into sleep mode.

Embodiments presented herein, or portions thereof, can be implemented in hardware, firmware, software, and/or combinations thereof. The embodiments presented herein apply to any communication system that utilizes packets for data transmission.

The representative functions described herein (e.g. functions performed by processor 200 or processor 206) can be implemented in hardware, software, firmware or some combination thereof. For instance, the method of flowcharts 300 and 400 can be implemented using computer processors (e.g. processors 200, 206), computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the functions described herein could be embodied by computer program instructions that are executed by a computer processor, for example processors 200 and 206, or any one of the hardware devices listed above. The computer program instructions cause the processor to perform the functions described herein. The computer program instructions (e.g. software) can be stored in a computer usable medium, computer program medium, or any storage medium that can be accessed by a computer or processor. Such media include a memory device, such as memory 202 or memory 208, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

Figure 5:
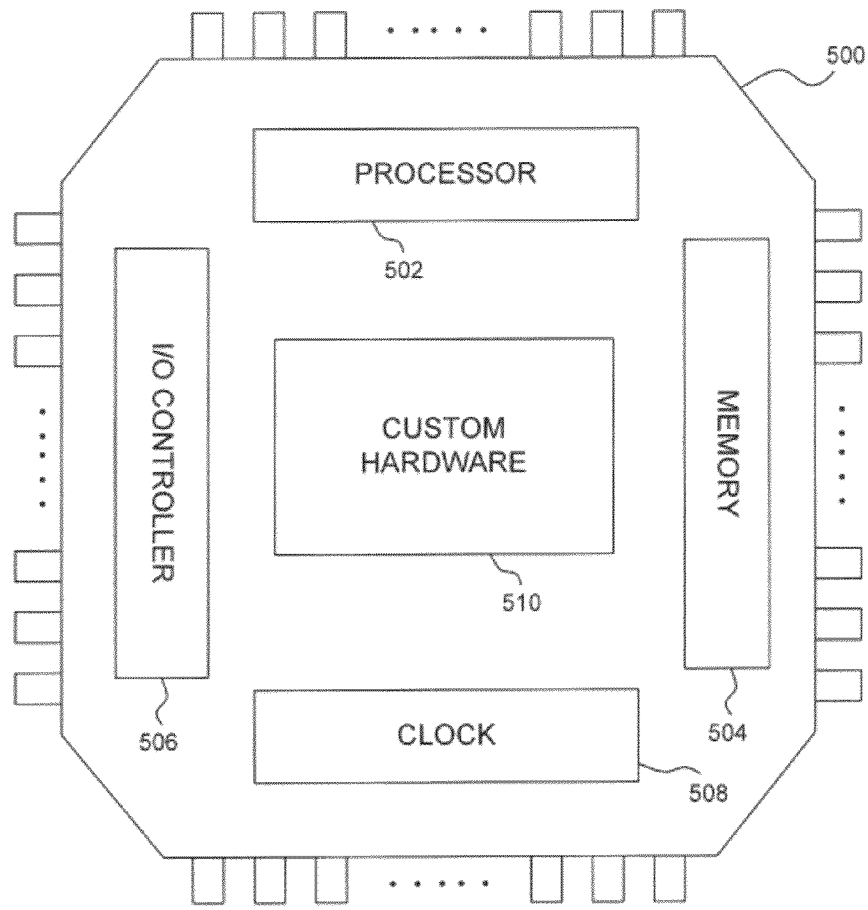
FIG. 5 is a diagram of an example System on Chip (SOC) 500 according to an embodiment of the present invention.

FIG. 5 is a diagram of an example System on Chip (SOC) 500 according to an embodiment of the present invention. System 500 includes a processor 502, a memory 504, an input/output (I/O) controller 506, a clock 508, and custom hardware 510. In an embodiment, SOC 500 is in an application specific integrated circuit (ASIC). System 500 may include hardwired circuitry or a Digital Signal Processing core in the form of custom hardware 510 to implement functions described herein.

Processor 502 is any processor, for example processor 200 or processor 206 described above, that includes features of the present invention described herein and/or implements a method embodiment of the present invention.

Memory 504 can be any memory capable of storing instructions and/or data. Memory 504 can include, for example, random access memory and/or read-only memory. Memory 504 may be memory 202 or memory 208.

Input/output (I/O) controller 506 is used to enable components of system 500 to receive and/or send information to peripheral devices. I/O controller 506 can include, for example, an analog-to-digital converter and/or a digital-to-analog converter. For example, I/O controller 506 may be used to control transceiver 204 or transceiver 210.

Clock 508 is used to determine when sequential subsystems of system 500 change state. For example, each time a clock signal of clock 508 ticks, state registers of SOC 500 capture signals generated by combinatorial logic. In an embodiment, the clock signal of clock 508 can be varied. The clock signal can also be divided, for example, before it is provided to selected components of system 500.

Custom hardware 510 is any hardware added to SOC 500 to tailor SOC 500 to a specific application. Custom hardware 510 can include, for example, hardware needed to decode audio and/or video signals, accelerate graphics operations, and/or implement a smart sensor. According to an embodiment of the invention, custom hardware 510 includes circuitry perform functions described above in flowcharts 300 or 400. Persons skilled in the relevant arts will understand how to implement custom hardware 510 to tailor SOC 500 to a specific application.

Conclusion

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A host device, comprising:
a memory;
a radio frequency (RF) transceiver configured to transmit and receive data to and from one or more wireless devices that are associated with the host device; and
a processor that manages an operating state of a first wireless device using the RF transceiver based on instructions stored in the memory, wherein the processor is configured to:
determine if the one or more wireless devices includes a second wireless device communicating with the host device over a same bandwidth spectrum as that used by the first wireless device;
cause the first wireless device to operate in a sniff mode if there is a second wireless device communicating with the host device over the same bandwidth spectrum as that used by the first wireless device; and
cause the first wireless device to operate in a sleep mode if there is not a second wireless device communicating with the host device over the same bandwidth spectrum as that used by the first wireless device.

2. The host device of claim 1, wherein the first wireless device is a Bluetooth peripheral device.

3. The host device of claim 2, wherein the first wireless device is a Bluetooth remote control.

4. The host device of claim 1, wherein the processor, based on instructions in the memory, continuously scans a bandwidth spectrum for data to be transmitted by the first wireless device when the first wireless device is being operated in the sleep mode.

5. The host device of claim 1, wherein in the sleep mode, the first wireless device is configured to turn off its processor and its radio frequency transceiver until the first wireless device has to transmit data to the host.

6. The host device of claim 1, wherein the processor is configured to, based on instructions in the memory, periodically scan a bandwidth spectrum for data to be transmitted by the first wireless device when the first wireless device is being operated in the sniff mode.

7. The host device of claim 1, wherein in the sniff mode, the first wireless device is configured to periodically power up its processor and radio frequency transceiver, synchronize with the host device, transmit data if data is present for transmission, and power down its processor and its radio frequency transceiver.

8. The host device of claim 1, wherein the processor is configured to, based on instructions in the memory, detect the second wireless device operating in the same bandwidth spectrum as the first wireless device, when the second wireless device requests to register itself with the host device as a slave device.

9. The host device of claim 1, wherein the processor is configured to, based on instructions in the memory, switch the first wireless device back to the sleep mode upon determining that the second wireless device has stopped operating in the same bandwidth spectrum as the first device.

10. The host device of claim 1, wherein the first wireless device is a device that transmits data to the host device at random intervals of time.

11. The host device of claim 1, wherein the second wireless device is a device that continuously or periodically transmits data to the host device.

12. The host device of claim 1, wherein the processor is configured to, based on instructions in the memory, switch the first wireless device to the sniff mode by sending a command packet to the first wireless device to operate in the sniff mode.

13. A method in a host device, wherein the host device is in wireless communication with one or more devices, including a first device, and manages an operating state of the first device, comprising:
   determining if a second device is communicating with the host device over a same bandwidth spectrum as that used by the first device;
   causing the first device to operate in a sniff mode if there is a second device communicating with the host device over the same bandwidth spectrum as that used by the first device; and
   causing the first device to operate in a sleep mode if there is not a second device communicating with the host device over the same bandwidth spectrum as that used by the first device.

14. The method of claim 13, wherein the first device is a Bluetooth remote control.

15. The method of claim 13, wherein in the sleep mode, the first device turns off its processor and radio frequency transceiver until the first device has to transmit data to the host device.

16. The method of claim 13, wherein in the sniff mode, the first device periodically powers up its processor and radio frequency transceiver, synchronizes with the host device, transmits data if data is present for transmission, and powers down the processor and the radio frequency transceiver.

17. The method of claim 13, wherein the causing the first device to operate in the sleep mode further comprises: continuously scanning a bandwidth spectrum for data to be transmitted by the first device when the first device is in the sleep mode.

18. The method of claim 13, wherein the determining comprises: determining whether the second device is attempting to register with the host device as a slave device that operates in the same bandwidth spectrum as the first device.

19. The method of claim 13, wherein the causing the first device to operate in the sniff mode comprises: sending a command packet to the first device to operate in the sniff mode.

20. The method of claim 13, wherein the causing the first device to operate in the sniff mode comprises: receiving a request from the first device to go into sleep mode and not replying to the request thereby causing the first device to switch to the sniff mode.

21. The method of claim 13, wherein the causing the first device to operate in the sniff mode comprises: receiving a request from the first device to go into the sleep mode and sending a command packet to the first device to switch to the sniff mode.

22. The method of claim 13, further comprising: switching the first device back to sleep mode when the second device is not using the bandwidth spectrum of the first device.

23. The method of claim 13, wherein the first device is a device that transmits data to the host device at random intervals.

24. The method of claim 13, wherein the second device continuously or periodically transmits or receives data to/from the host device.

25. The method of claim 13, wherein the second device is a wireless Local Area Network (WLAN) device, a gestural input device, a portable media player, a cellular phone, a Voice over IP (VoIP) device, three-dimensional glasses or a streaming audio headset.

26. The method of claim 13, wherein the host device is a master device and the first and second devices are slave devices.

27. The method of claim 13, wherein the host device is one of a television, a cable television set-top box, a blu-ray player, a receiver or an amplifier.

* * * * *